INVENTORS
DONALD E. DARR
ROGER S. LEISER
CLIFFORD E. LOEHR
KENNETH W. RICHARDSON
BY
ATTORNEYS

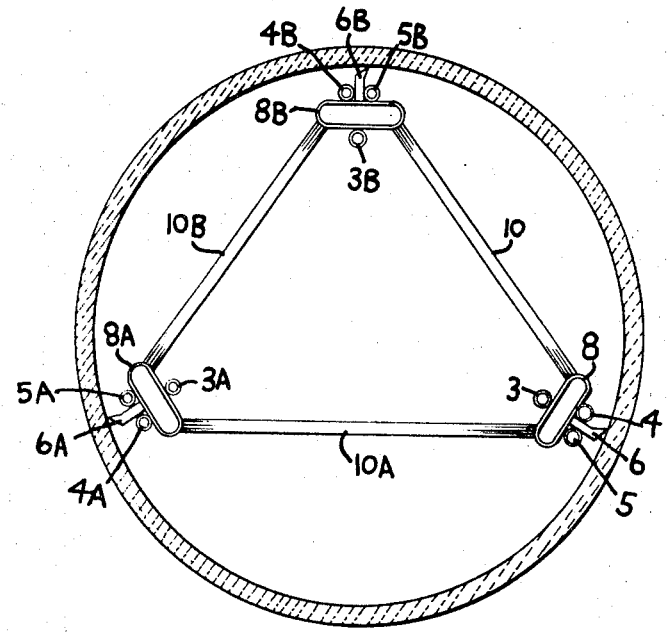
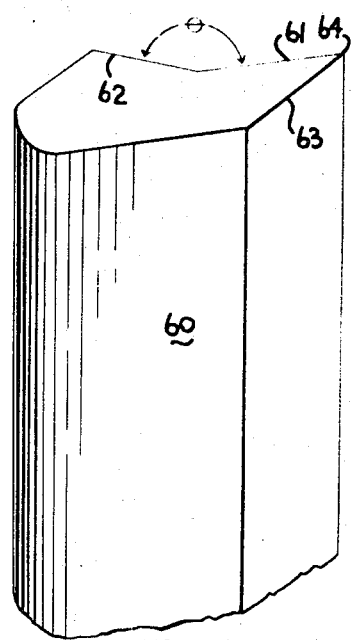
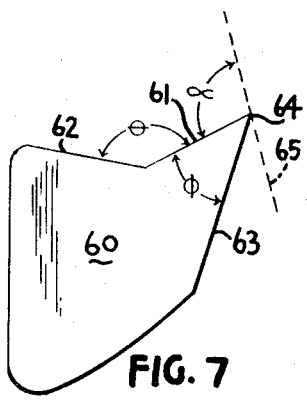
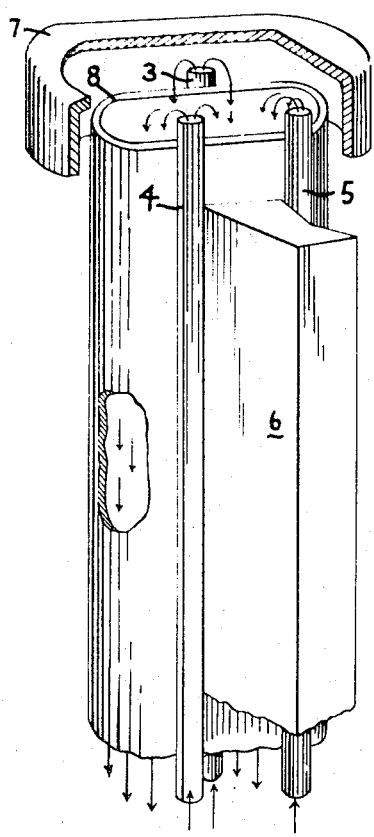
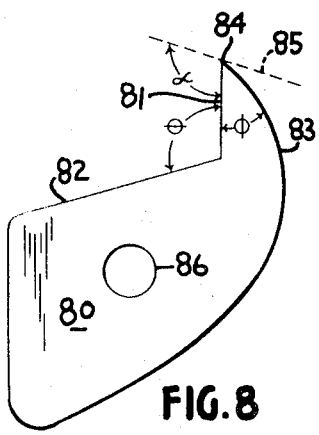

United States Patent Office 3,550,177
Patented Dec. 29, 1970

3,550,177
APPARATUS FOR REMOVING METAL OXIDE SCALE FROM A REACTOR WALL
Donald E. Darr, Wadsworth, Ohio, Roger S. Leiser, Decatur, Ill., and Clifford E. Loehr, Akron, and Kenneth W. Richardson, Barberton, Ohio, assignors to PPG Industries, Inc., Pittsburgh, Pa., a corporation of Pennsylvania
Original application July 2, 1964, Ser. No. 379,825, now Patent No. 3,423,186, dated Jan. 21, 1969. Divided and this application Aug. 15, 1968, Ser. No. 753,014
Int. Cl. B08b 9/08
U.S. Cl. 15—104.1   14 Claims

ABSTRACT OF THE DISCLOSURE

The preparation of metal oxide, e.g., titanium dioxide, by vapor phase oxidation of metal halide, e.g., titanium tetrahalide, is described. Difficulties in maintaining reactor operation because of metal oxide scale buildup within the reactor is discussed. Method and apparatus are proposed for eliminating such difficulties.

CROSS-REFERENCE TO RELATED APPLICATIONS

This application is a division of application Ser. No. 379,825, filed July 2, 1964, in the names of Donald E. Darr, Roger S. Leiser, Clifford E. Loehr, and Kenneth W. Richardson, now U.S. Pat. 3,423,186.

BACKGROUND OF THE INVENTION

In the typical vapor phase oxidation process for the production of titanium dioxide, titanium tetrahalide, and an oxygenating gas, e.g., oxygen or oxygen-containing gas, are introduced into a closed reaction chamber either in the presence or absence of a fluidized bed, the chamber preferably maintained at a temperature above 600° C. in a range of about 850 to 1700° C. Typical processes are disclosed in U.S. Letters Patents 2,653,078 to Lane; 2,750,260 to Nelson et al.; 2,791,490 to Willcox; 2,670,275 to Olson et al.; 2,823,982 to Saladin et al.; 2,968,529 to Wilson; 2,989,509 to Frey; 3,068,113 to Strain et al.; 3,069,281 to Wilson; and 3,069,282 to Allen.

The metal halide, e.g., titanium tetrachloride, is preferably introduced into the reaction chamber or reactor in a vapor state and is oxidized by oxygen or oxygen-containing gas such that titanium dioxide is formed.

The walls of the oxidation reaction chamber are preferably constructed out of a zirconium base brick, ceramic, or other suitable material. A frequent problem encountered in the production of titanium dioxide is the formation of a metal oxide growth or encrustation upon the walls of the reaction chamber. If this encrustation or metal oxide formation and buildup is not timely removed, it develops into a donut or ring which eventually closes up and plugs the reactor, thereby hindering the continuous and economical operation of a $TiO_2$ vapor phase oxidation process and making the process impractical as a commercial operation.

In the prior art, several methods have been proposed for removing the metal oxide accumulation. Thus, it has been proposed to flow a gas transversely through the reactor walls. See, for example, U.S. Letters Patent 2,957,753. U.S. Letters Patent 2,805,921, issued to Schaumann (also note British specification 822,910) teaches the dislodging of the scale by means of an internally cooled cutting element. The reactor walls also may be cleaned via sonic vibrators. It has also been taught that oxide scale buildup may be prevented by diffusion of inert gases through porous metal walls. Belgian Pat. No. 640,553 teaches the flexing of the reactor walls as a means of removing oxide growth.

BRIEF SUMMARY OF THE INVENTION

This invention relates to a novel method and apparatus to be used in conjunction with the oxidation of a metal halide to produce metal oxide. More particularly, it relates to a method and apparatus to be used in the production of titanium oxide by the vapor phase oxidation of titanium tetrahalide, e.g., titanium tetrachloride, titanium tetrabromide, and titanium tetraiodide.

In the practice of the present invention, the metal oxide scale buildup is continuously removed and further buildup prevented by passing one or more solid ceramic or lava edges immediately adjacent to the surface of the reactor wall, such that each solid ceramic edge brushingly contacts and displaces the metal oxide accumulation.

In one embodiment, the solid ceramic edges are arranged in a circular or ring-like fashion about the reactor axis and moved to and fro, that is, reciprocated upwardly and downwardly, in a direction parallel to the reactor axis.

In a preferred embodiment, the ceramic edges are positioned as arms or strips parallel to the reactor axis and moved in a circumferential direction along the reactor wall about the axis.

Likewise, in the preferred practice of this invention, it is preferred that the solid ceramic dedusting members or edges be supported and retained in the predetermined position by means of support members thereby increasing the over-all section modulus. Such support members are particularly desirable where one or more ceramic arms are projected upwardly from the bottom of the reactor in cantilever fashion along the reactor walls, that is, in a direction parallel to the reactor axis.

Although the supports may be constructed out of ceramic material, it is preferred to employ a material that will provide high strength per pound, particularly at the elevated temperature conditions within the reactor. It has been found that a suitable material is nickel formed or shaped as tubular or pipe-like elements and through which there is circulated a cooling heat transfer fluid.

Although the supports may be constructed out of a metal material as noted above, it is essential that the brushing or dedusting arms be constructed out of ceramic since metallic materials abrade and quickly wear away, particularly at the edge such that there results a flattened edge which tends to compact the metal oxide onto the wall surface rather than remove it. However, when ceramic is employed, the solid edge member retains its shape and thus continues to perform its brushing and dedusting function over a prolonged period.

BRIEF DESCRIPTION OF THE DRAWINGS

The invention will be better understood by reference to the drawings and the figures thereon.

FIG. 2 represents a cross-section through FIG. 1 through a plane just below the caps 7, 7A, and 7B, parallel to the reactor bottom 12.

FIG. 3 represents a modification of FIG. 1 wherein only one ceramic deduster arm is employed.

FIG. 6 represents a three-dimensional view of a ceramic dedusting arm.

FIG. 7 represents a plan view of FIG. 6.

FIG. 8 represents a plan view of a modification in the geometric shape of the ceramic dedusting arm.

DETAILED DESCRIPTION

Figure 1:
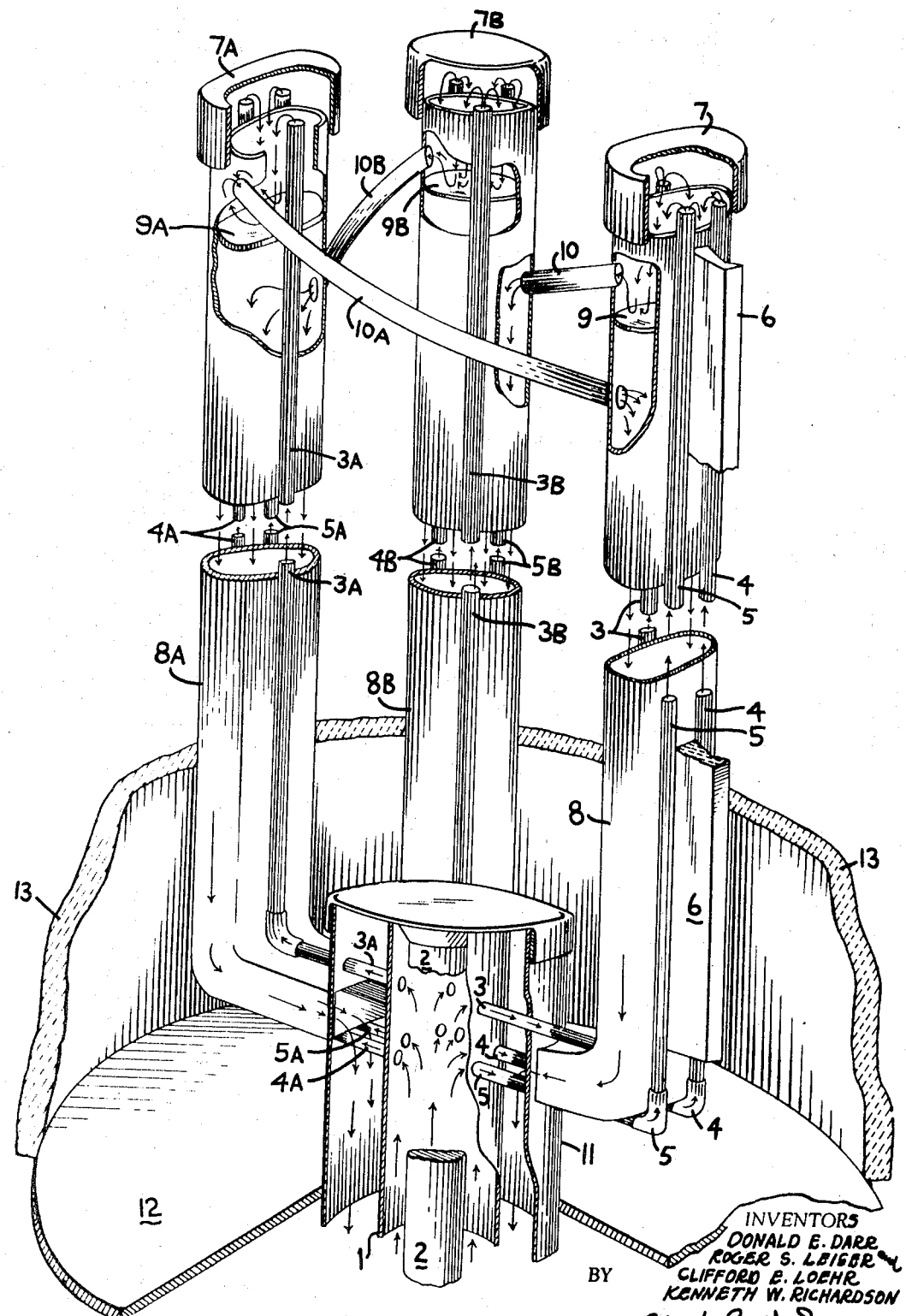
FIG. 1 represents a three-dimensional view of one preferred practice of the present invention.
Figure 5:
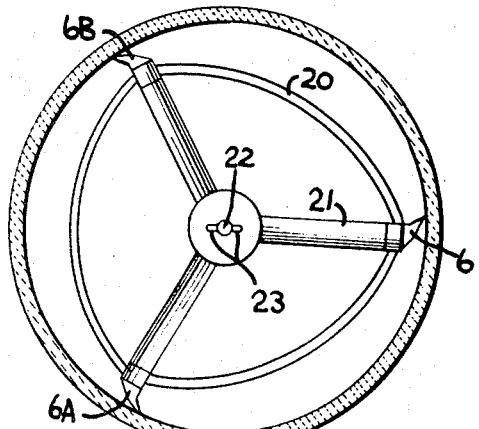
FIG. 5 is a plan view of FIG. 4.

FIG. 1 represents an over-all three-dimensional view of one preferred embodiment of the present invention. FIG. 2 is a plan view of FIG. 1.

More particularly, there is shown in part a cylindrical metal oxide reactor wall 13 and a bottom 12 with axial shaft 2 and concentric conduits 1 and 11 projecting upwardly through the center of bottom 12.

A cooling fluid is introduced from a source (not shown) into inlet conduit 1 and is flowed upwardly about the shaft 2. At or near the top of conduit 1, the fluid stream splits and flows into support conduits 3, 4, 5, 3A, 4A, 5A, 3B, 4B, and 5B, each of which is connected to and projects from conduit 1 at an angle, e.g., 90°, and then curves upwardly, e.g., by means of an elbow in a direction substantially parallel to the projected common axis of the shaft and conduits 1 and 11.

Ceramic dedusting arm 6 is held and maintained in a predetermined position in between support conduits 4 and 5 as shown. Similarly, each pair of support conduits 4A and 5A, 4B and 5B, retains and supports respectively a ceramic dedusting arm 6A and 6B as shown in FIG. 2.

In addition, support conduits 3, 4, and 5 support and retain center return conduit 8 in a predetermined position. Similarly, conduits 3A, 4A, and 5A retain return conduit 8A and conduits 3B, 4B, and 5B retain return conduit 8B. Return conduits 8, 8A, and 8B are preferably flattened to an eliptical shape as shown in the FIGS. 1 and 2. Tubes 3, 4, 5, 3A, 4A, 5A, 3B, 4B, and 5B also may be flattened to an eliptical shape.

At the top of center return conduit 8, there is affixed a cap 7 which provides a common closed chamber for conduits 3, 4, 5, and 8. Similarly, cap 7A is affixed to conduits 8A and cap 7B is affixed to conduit 8B, thereby providing common chambers, respectively, for conduits 3A, 4A, 5A, 8A, and 3B, 4B, 5B, and 8B.

Internally of each conduit 8, 8A, and 8B, there is provided, respectively, baffle means 9, 9A, and 9B.

Conduit 8 is then joined by connecting conduit 10 to conduit 8B, the conduit 10 being connected and joined to conduit 8 at a point above baffle 9 and to conduit 8B at a point below baffle 9B.

Similarly, conduit 8B is connected to 8A by means of 10B, which joins 8B at a point above 9B and 8A at a point below 9A.

Finally, conduit 8A is connected to 8 by 10A which connects 8A at a point above baffle 9A and 8 at a point below baffle 9.

Thus, in the operation of the novel dedusting apparatus hereinbefore described, a cooling fluid flows into and upwardly through conduits 3, 4, 5, 3A, 4A, 5A, 3B, 4B, and 5B.

The fluid flows out of the upward ends of conduits 3, 4, and 5 into the chamber provided by cap 7 and then downwardly through center return conduit 8 to baffle 9, and then through connecting conduit 10 to return conduit 8B (at a point below baffle 9B). The fluid then continues its flow downwardly in conduit 8B to exit conduit 11 which is connected to an appropriate reservoir (not shown).

Simultaneously, fluid in conduit tubes 3B, 4B, and 5B flows into the chamber of cap 7B, downwardly through center conduit 8B to baffle 9B, through connecting tube 10B to center conduit 8A (below baffle 9A) and downwardly into conduit 11.

Likewise, fluid in conduit tubes 3A, 4A, 5A flows into the chamber of cap 7A, downwardly through center conduit 8A to baffle 9A, through connecting tube 10A to center conduit 8, and downwardly in tube 8 to conduit 11.

Simultaneously, the entire assembly is rotated by shaft 2 which is connected to any appropriate or conventional drive means (not shown), and as the assembly turns, the ceramic scraping arms or elements contact and brush accumulated metal oxide from the reactor wall 13. The cooling fluid flowing in tube 1 helps to cool the shaft 2 and also protects it from the hot fluid exiting through tube 11.

Although FIGS. 1 and 2 illustrate the use of three ceramic arms, it is to be understood that additional arms may be added by one skilled in the art. Likewise, it is possible to employ less than three arms, e.g., one arm such as shown in FIG. 3.

The embodiment of FIG. 1 can be operated without the use of baffles 9, 9A, and 9B and connecting conduits 10, 10A, and 10B, such that the cooling fluid flow through the supports of each arm is independent of the flow in every other arm. However, when such a system is employed, an unequal pressure drop and temperature regulation results and hot spots can occur with burnout in one or more supports unless the flow conditions in each arm are balanced.

FIG. 3 represents a modification of FIG. 1 wherein there is provided only one arm 6 with only one series of supports 3, 4, 5, and 8. The lower or bottom portions of tubes 3, 4, 5, and 8 are not shown in FIG. 3 but are connected to tubes 1 and 11 the same as illustrated in FIG. 1. Baffle 9 as shown in FIG. 1 is removed such that the cooling fluid from support tubes 3, 4, 5, is returned directly to conduit 11 by means of return tube 8.

Since only one arm 6 is provided, the cantilever effect in FIG. 3 is more pronounced than in FIG. 1; and, accordingly, it may be preferred to uniformly and gradually increase the section modulus of the arm 6 and/or supports 3, 4, 5, and 8 in a direction toward the reactor bottom 12.

Although FIGS. 1, 2, and 3 illustrate the use of four tubes, e.g., 3, 4, 5, and 8, it will be obvious to one skilled in the art that fewer or more support tubes may be employed.

Figure 4:
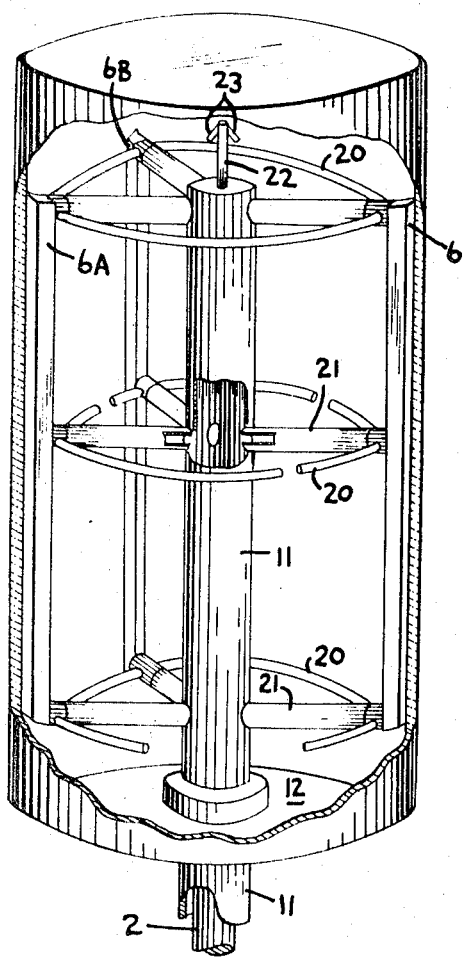
FIG. 4 represents a three-dimensional view of a further practice of the present invention.

FIG. 4 represents a further modification. More particularly, there is shown three arms 6, 6A, and 6B with ring supports 20 and radial supports 21 connected to a central axial support 11.

In a preferred arrangement, the supports are tubes through which there is circulated a cooling fluid which is from a source (not shown) to axial tube 11. At the top of tube 11 there is shown a further tube 22 with downwardly projecting nozzles 23 from which the circulated fluid is discharged into the interior of the reactor 13.

FIGS. 6 and 7 illustrate a three-dimensional and a plan view, respectively, of a ceramic dedusting arm. More particularly, there is shown a ceramic arm 60 having two sides, 61 and 62, at an exterior angle theta $\theta$. Also, there is shown side 63 at an interior angle phi $\phi$ to side 61, such that sides 61 and 63 project to a ceramic dusting edge 64. The broken line 65 represents a tangent to the reactor wall 13 at the projected contact of the point 64 to the wall, the side 61 being at an angle alpha $\alpha$ to the tangent 65.

FIG. 8 is a plan view of a modification of the ceramic arm of FIG. 6. There is shown a ceramic arm 80 having sides 81 and 83 forming a point 84 with an angle phi $\phi$ between the two sides, and a side 82 at an angle theta $\theta$ to the side 81. The broken line 85 represents a tangent to the reactor wall 13 at the projected contact of the point 84 to the wall 13, the side 81 being at an angle alpha $\alpha$ to the tangent 85. There is also shown in FIG. 8 a hole 86 in the body of the arm through which there may be inserted a support rod for the arm. Such a support rod would not have to be resistant to corrosion, e.g., from chlorine and/or oxygen, since the ceramic arm would serve as a protective layer. However, the metal would have to retain a reasonable tensile strength at elevated temperatures, e.g., at about 1600° F. Such metals would include, for example, alloys of iron, carbon, titanium, zirconium, hafnium, vanadium, tungsten, nickel, and/or chromium.

Figure 9:
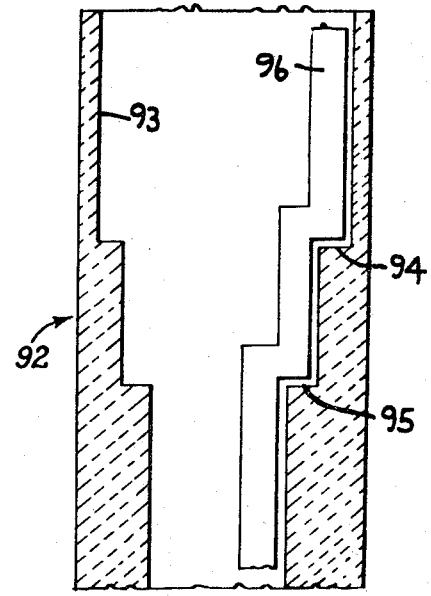
FIGS. 9 and 10 represent cross-sectional views of various reactor shapes and also show schematically the positioning of a ceramic arm within each reactor.

FIG. 9 shows a reactor 92 having an inside wall 93 which is decreased in diameter by means of steps or corbels 94 and 95. As shown in the figure, there is provided a single ceramic arm 96 which follows the contour of the wall 93.

Figure 10:
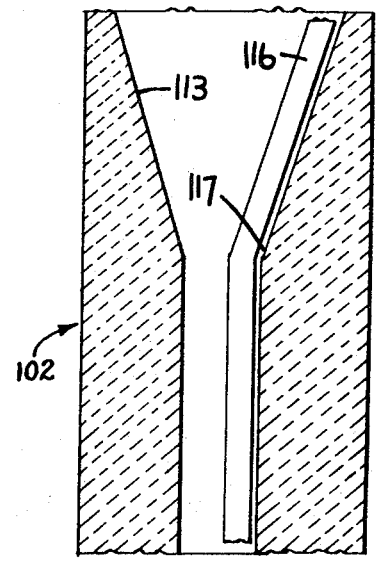

FIG. 10 shows a reactor 102 having an inside wall 113 which uniformly and gradually decreases in diameter to a point 117. As shown in the figure, there is provided a single ceramic arm 116 which follows the contour of the wall 113.

Figure 11:
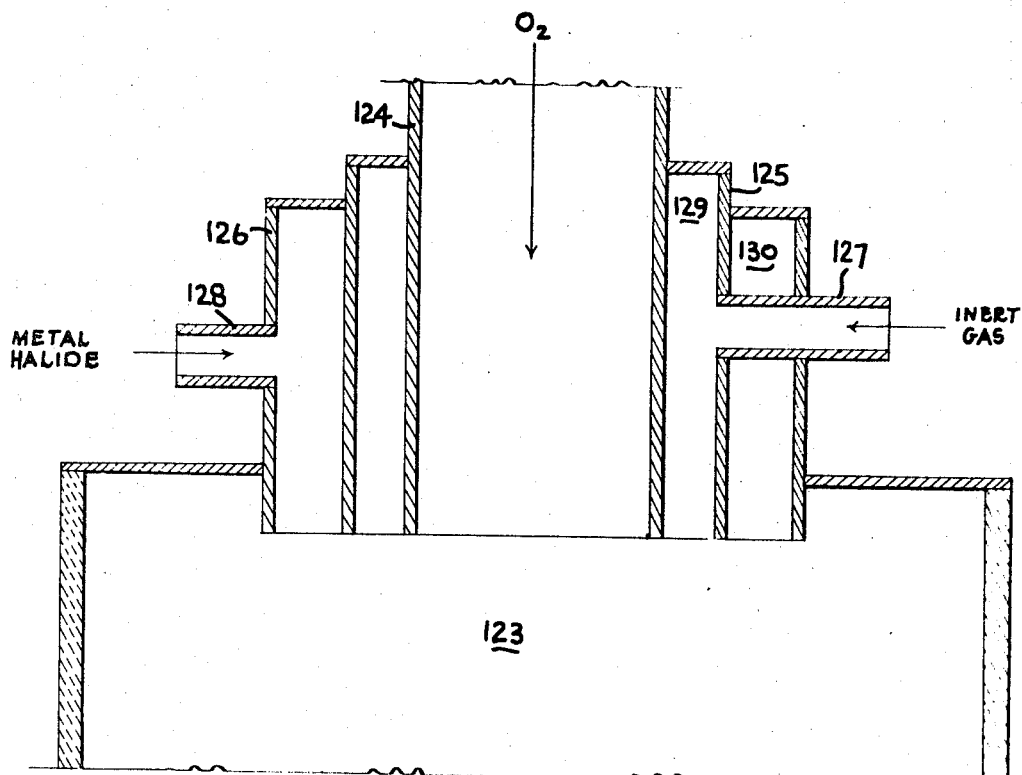
FIG. 11 represents a top portion of a reactor with a concentric tube arrangement by which reactants are introduced.

FIG. 11 shows the top portion of a reactor 123 having an arrangement of concentric tubes for the introduction of reactants. More particularly, there is shown an inner tube 124 through which an oxygenating gas, e.g., oxygen, $NO_2$, $NO_3$, $H_2O_3$, is introduced into the reactor 123. There is also shown a tube 125 which is concentric to tube 124 whereby an annulus 129 is formed. An inert gas is fed by means of tube 127 into annulus 129 and then emitted from annulus 129 into the reactor 123. Preferably, tube 127 is a wide-angle distribution tube as disclosed in copending U.S. application Ser. No. 360,937, filed Apr. 20, 1964, by Benner and Loehr. By "inert gas" it is meant any gas which is inert with respect to the metal halide and oxygenating reactants, for example, chlorine, argon, nitrogen, helium, krypton, xenon, carbon dioxide, or mixtures thereof.

External to tube 125, there is provided concentric tube 126 such that annulus 130 is formed. Metal halide, preferably in a vaporous state, is introduced through tube 128 into annlus 130, the halide then flowing into reactor 123. Tube 128 is preferably a wide-angle distribution tube, the same as tube 127.

Where only one ceramic arm is employed, e.g., as disclosed in FIGS. 3, 9, and 10, the arm is characteristically rotated about the inside circumference of the reactor wall at a rate of 1/3 to 540 revolutions per hour, preferably 1½ to 4 revolutions per minute, that is, at a preferred rate of about 80 to 250 feet of internal wall circumference per minute for a reactor 14 feet in diameter. Where more than one arm is used, the rate may be appropriately decreased by a factor equal to the total number of ceramic arms employed.

As noted hereinbefore, it is essential that the dedusting arm be of a ceramic material since other materials, particularly metals, wear quickly and cause the dedusting arm to become a compaction device and bend inwardly. Any ceramic material may be employed which has a thermal conductivity of less than 210 B.t.u./(hr.), (sq. ft.), (° F./inch), preferably less than 25, and a hardness of at least 5.0 on the Mohs' scale (where talc equals 1.0 and and diamond equals 10.0). In addition, the ceramic should have sufficient resistance to a corrosive environment, e.g., chlorine, at an elevated temperature of 1832° F.

A typical ceramic which is used in the practice of this invention is a steatite product of talc, such as $3MgO \cdot 4SiO_2 \cdot H_2O$. Likewise, there may be used ceramic materials containing fused oxides such as alumina ($Al_2O_3$), zirconia ($ZrO_2$), thoria ($ThO_2$), beryllia (BeO), magnesia (MgO), apinel ($MgAl_2O_3$), forsterite ($Mg_2SiO_4$); also, ceramic nitrides, such as silicon nitride, aluminum nitride, boron nitride, ferroelectric ceramics, such as barium titanate; or mixtures of same. Likewise, silicates, e.g., aluminum silicate or magnesium silicate, may be used. In addition, there may be employed ceramics containing $CaSiO_3$ (wallastonite), $Al_2(Si_2O_5)_2(OH)_2$ (pyrophyllite), $Al_2SiO_5$ (sillimanite), $Al_6Si_2O_{13}$, and $Mg_3(Si_2O_5)_2(OH)$, as well as mixtures of same.

Typical compositions would include 78 percent by weight $Al_2O_3$, and 20 percent by weight $SiO_2$; 81 to 85 percent by weight $Al_2O_3$, and 14 to 16 percent by weight $SiO_2$; 70 percent by weight $Al_2O_3$; and 92.5 percent by weight $ZrO_2$ and 5 percent by weight CaO; and 97 percent by weight MgO and 2 percent by weight $SiO_2$. Furthermore, the ceramic wall of the reactor is preferably selected from the same or similar ceramic and lava materials.

If metal supports are provided as illustrated in FIGS. 1 to 5, it is desirable that a cooling fluid be circulated internally of the supports in order to keep the surface temperature of the selected support material below the temperature at which the metal material corrodes, e.g., from attack by halides and/or halogen gases, particularly chlorine, and below the temperature at which the metal strength sharply declines. At lower temperatures, the tensile strength of the metal-like materials is greater than at higher temperatures. Where the supports are constructed out of nickel or a nickel alloy, the surface temperature should be maintained below the temperature at which chlorine or other halide will attack the metal, e.g., below 1000° F. for most nickel alloys, preferably, 500° to 700° F.

The surface temperature of the metal support is preferably controlled by regulating the volume per unit time of cooling fluid which is circulated internally of the support.

Where a support is provided internally of the arm, as illustrated in FIG. 8, such support may be a solid member since it will be protected from corrosion by the surrounding ceramic arm.

Typical nickel alloys which may be employed are listed in the "Handbook of Huntington Alloys," published by the Huntington Alloy Products Division of the International Nickel Company, Inc., (first edition, March 1962), on pages 4 and 6, particularly Nickel 200 which consists of 99.45 percent nickel, 0.06 percent carbon, 0.25 percent magnesium, 0.15 percent iron, 0.005 percent sulphur, 0.05 percent silicon, and 0.05 percent copper, all by weight.

The cooling fluid employed comprises air, $H_2O$ (water or steam), or inert gases, such as nitrogen, argon, helium, krypton, xenon, carbon dioxide, or mixtures thereof. Furthermore, the reactants, e.g., metal halide, such as $TiCl_4$ or oxygen-containing gas may be passed internally through the support tubes such that the tubes are cooled and the reactants are preheated. The preheated reactant can then feed directly into the reaction chamber, e.g., as illustrated in FIG. 4. Likewise, various liquid and gaseous nucleating or rutile promoting agents may be employed as a cooling heat transfer fluid, particularly those metals which form a white oxide, such as silica and alumina. In addition, carbon monoxide may be circulated as a cooling fluid in place of, in addition to, or mixed with the gases noted above, the CO then being fed into the reaction chamber to be oxidized and to supply heat to the reaction zone for the sustaining of the reaction. Sulphur-containing compounds, as disclosed in copending U.S. Application Ser. No. 15,300, now U.S. Pat. 3,105,742, may also be employed. Finally, the cooling fluid may comprise a recycle stream of gases from the reactor chamber, preferably a recycle stream from which the metal oxide pigment product, e.g., $TiO_2$, has been precipitated or otherwise removed from the effluent gas stream, e.g., by means of a dust collector or cyclone.

The point or edge of the ceramic arm is located and positioned adjacent to the internal surface of the reactor wall at a distance of ¼ inch (one-quarter inch) to 9 inches (nine inches), preferably ¾ inches (three-quarters inch) to 2 inches (two inches).

The angle alpha $\alpha$, as shown in FIGS. 6 and 8, should exceed 90° (ninety degrees), preferably 110° (one hundred ten degrees) to 145° (one hundred forty-five degrees).

The angle theta $\theta$, as shown in FIGS. 6 and 8, suitably should exceed 135°, whereas the angle phi $\phi$, in FIGS. 6 and 8, suitably should range from 15° to 75°, preferably 30° to 55°.

Where the scraper arms and supports are projected upwardly from the bottom of the reactor, as disclosed in FIG. 1, there is a cantilever affect such that the portion of the supports near the bottom is under greater stress than that portion at a greater distance from the bottom. This canilever affect is particularly pronounced where a single arm (with supports) is employed, e.g., FIG. 3.

The cooling fluid is introduced into the system, e.g., via conduit 1 in FIG. 1, at a temperature of 150° F. to 300° F., preferably 200° F. to 250° F., such that it exits, e.g., conduit 11 in FIG. 1, at a temperature of 200° F. to 500° F. Temperatures below 150° F. tend to cool the reaction zone, whereas temperatures above 300° F. cause the supports to overheat.

Where the cooling fluid is a gas, it suitably is flowed through the supports at 300 to 900 standard cubic feet per minute calculated at 70° F. and one atmosphere (14.7 pounds per square inch absolute) pressure.

Where air is employed as a cooling media in the practice of this invention, it has been found that the optimum air flow rate (standard cubic feet per minute) per effective outside cooling area of the metal supports (square feet) should range from 5 to 10, preferably 6.5 to 8.5. Effective outside cooling area is defined as that external portion of the support exposed to the reactor corrosion and thermal conditions, e.g., that portion exposed within the reactor.

Where the length of the arm and supports is long, e.g., in excess of 10 feet, the section modulus of at least one support should be gradually and uniformly increased in a direction toward the reactor bottom in an amount sufficient to withstand and endure the increasing stress.

Where a support is a tubular element with an internal diameter $d$ and an outside diameter $D$, the section modulus $Z$ is determined by the formula:

$$Z = 0.098 \frac{D^4 - d^4}{D}$$

Where a support has a square cross-sectional area with an outer side $A$ and an internal square opening having a side $B$, with a uniform wall thickness between $A$ and $B$, and if the side $A$ is parallel to the reactor tangential at the point of projection of the ceramic arm edge, the section modulus $Z$ is determined by the following formula:

$$Z = \frac{A^4 - B^4}{6A}$$

Where the support is an elliptical tube, e.g., conduits 8, 8A, and 8B in FIG. 1, having an outer major radius $a$, outer minor radius $b$, inner major radius $c$, minor radius $d$, the section modulus is determined by the following formula:

$$Z = 0.7854 \frac{a^3 d - c^3 d}{a}$$

In the practice of this invention, it has been found particularly advantageous to employ a vapor phase oxidation process wherein aluminum trichloride ($AlCl_3$) is added as a nucleating agent to the reaction zone, preferably with the metal halide reactant, e.g., $TiCl_4$, in an amount sufficient to give a final $TiO_2$ pigment product containing 0.1 to 8 percent $Al_2O_3$, preferably 1 to 4 percent by weight of the pigment.

When so practicing the invention, the $TiO_2$ pigment which adheres to the reactor wall surprisingly contains a higher percent by weight of $Al_2O_3$ than the $TiO_2$ product exiting from the reactor. Thus, whereas the product contains 1½ percent by weight $Al_2O_3$, the $TiO_2$ on the wall surface contains 3 to 7 percent, usually about 5 percent, by weight $Al_2O_3$.

The following are typical working examples.

EXAMPLE I

Three ceramic dedusting arms were arranged in a vertical cylindrical reactor, as shown in FIGS. 1 and 2. The reactor was 14 feet long with an internal diameter of 4 feet; one-sixth (⅙) of the internal wall was constructed out of brick comprising 45.1 percent $Al_2O_3$, 51.9 percent $SiO_2$, 1.4 percent $Fe_2O_3$, 1.7 percent $TiO_2$, 0.1 percent CaO, 0.3 percent $Na_2O$, and a trace of MgO, all by weight and the remaining five-sixths (⅚) was constructed out of brick comprising 40.0 percent $Al_2O_3$, 54.6 percent $SiO_2$, 2.4 percent $Fe_2O_3$, 1.2 percent $TiO_2$, 1.5 percent CaO, 0.1 percent MgO, 0.4 percent alkalies, all by weight.

All of the supports for the ceramic arms were constructed out of a Nickel 200 consisting of 99.45 percent nickel, 0.06 percent carbon, 0.25 percent magnesium, 0.15 percent iron, 0.005 percent sulphur, 0.05 percent silicon, and 0.05 percent copper, all by weight.

The supports 4, 5, 4A, 5A, 4B, and 5B, were fabricated out of 1-inch Schedule 40 pipe flattened into an ellipse having a major outside axis or diameter of 1½ inches (one and one-half inches).

The supports 8, 8A, and 8B were fabricated out of 3 inch Schedule 40 pipe flattened into an ellipse having a minor inside axis or diameter of 1⁹⁄₁₆ inches (one and nine-sixteenths inches).

The supports 3, 3A, and 3B, were fabricated out of 2-inch Schedule 40 pipe flattened into an ellipse having a minor inside axis or diameter of about 1½ inches (one and one-half inches).

Exit conduit 11 was fabricated out of 8-inch Schedule 40 pipe.

Inlet conduit 1 was fabricated out of 6-inch Schedule 40 pipe.

Tubes 10, 10A, and 10B, were fabricated out of 1½-inch Schedule 40 pipe.

Shaft 2 was fabricated out of a 3-inch hot rolled carbon steel and was connected to a 7.5 horsepower motor by means of a belt drive, the motor being designed to rotate the shaft 2 and the ceramic arms at three revolutions per minute.

The ceramic arms 6, 6A, and 6B, were constructed out of a steatite product of talc, $3MgO \cdot 4SiO_2 \cdot H_2O$. Angles theta $\theta$, and phi $\phi$, were respectively about 135° (one hundred thirty-five degrees) and 30° (thirty degrees). Angle alpha $\alpha$, was in excess of 90° (ninety degrees).

At the top of the reactor, three concentric tubes were arranged as shown in FIG. 11, 38 gram-moles per minute of oxygen at 1150° C. being continuously fed through tube 124 having an internal diameter of four inches while 32 gram-moles per minute of titanium tetrachloride at 525° C. were continuously fed through tube 128 into annulus 130 having a maximum diameter of 12 inches. Chlorine at 400° C. was continuously fed at a rate of 5 to 7 gram-moles per minute into annulus 129 having a maximum diameter of seven inches.

Sixty to 130 grams per minute of vaporous aluminum trichloride at 300° C. were introduced into the $TiCl_4$ stream before it was fed into annulus 130. Liquid silicon tetrachloride at the rate of 0.19 gram-mole per minute was also added to the $TiCl_4$ before the introduction of the $TiCl_4$ into the annulus.

As the three ceramic arms were rotated at three revolutions per minute along the internal wall surface of the reactor, air was circulated by blower means through the supports at the rate of 550 standard cubic feet per minute calculated at 70° F. and 1 atmosphere (14.7 pounds per square inch absolute). The air was fed into conduit 1 at 225° F. and 13.5 pounds per square inch gage. The exit temperature of the air stream to the atmosphere from conduit 11 was 375° F., the pressure drop of the air stream through the system being 13.5 pounds per square inch.

The design air velocity through each support 4, 5, 4A, 5A, 4B, and 5B, was 129 feet per second. The design air velocity through each support 8, 8A, 8B was 113 feet per second. The calculated air flow rate per effective cooling area of the supports was 7.85 standard cubic feet of air at 70° F. and one atmosphere per square foot of effective external cooling area for the supports.

The process was operated continuously in excess of 168 hours and intermittently in excess of 1440 hours without any plugging of the reactor. During this time, the metal oxide removed from the reactor walls analyzed at 3 to 6 percent by weight $Al_2O_3$. By comparison, the pigmentary $TiO_2$ product exiting from or near the reactor bottom contained ¾ to 2 percent by weight $Al_2O_3$.

The product was then wet finished and coated with 0.01 to 8 percent by weight silica, 0.1 to 4 percent by weight $TiO_2$ and 0.05 to 15 percent by weight $Al_2O_3$, (all basis the weight of the pigment) in an acid pH media using the procedure set forth in the copending U.S. application Ser. No. 121,327, filed July 3, 1961, by Dr. Hartien S. Ritter, now U.S. Letters Patent 3,146,119.

A typical pigment product after wet coating had a tinting strength in excess of 1720 on the Reynolds scale as determined in accordance with A.S.T.M. D–332–26, ("1949 Book of A.S.T.M. Standards," part 4, p 31, published by the American Society for Testing Materials, Philadelphia, Pa.

EXAMPLE II

The procedure, as set forth in Example I, was followed, except that the ceramic arms and nickel supports were removed from the reactor. In other words, the vapor phase $TiO_2$ oxidation was operated not in accordance with this invention.

The reactor was operated continuously for 24 hours at which time $TiO_2$ buildup on the internal surface of the reactor plugged the reactor. A typical pigment product after wet coating had a tinting strength on the Reynolds scale below 1650.

EXAMPLE III

The procedure, as set forth in Example I, was followed, except that no ceramic arms were employed. Instead, a rotating air-cooled nickel alloy edge was used. The device was operated intermittently for 192 hours out of 360 hours, at which time it structurally failed due to abrasion and heat stress. In addition, the nickel edge tended to compact the metal oxide onto the surface of the wall and did not satisfactorily remove it.

Although this invention has been described with particular reference to titanium tetrahalide, e.g., titanium tetrachloride, titanium tetrabromide, and titanium tetraiodide, it may be used in the production of other pigmentary metal oxides.

The term "metal," as employed herein, is defined as including those elements exhibiting metal-like properties, including the metalloids. Examples, not by way of limitation, but by way of illustration of pigmentary metal oxides which may be produced by the aforementioned process, are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, yttrium, ytterbium, zinc, zirconium, niobium, gallium, antimony, lead, and mercury.

Obviously, many modifications and variations of the present invention are possible in light of the above teachings, and will be obvious to one skilled in the art. Thus, it will be understood that the invention is in no way to be limited except as set forth in the following claims.

We claim:

1. An apparatus for removing metal oxide from the wall of a reactor chamber having a centrally disposed longitudinal axis comprising:
   (a) at least one elongated ceramic edge in brushing contact with metal oxide on said wall, said edge extending substantially parallel to said wall in the direction of said longitudinal axis;
   (b) support means extending along each ceramic edge for supporting said edge in brushing contact with said metal oxide;
   (c) means for moving said support means and thus said ceramic edge across said metal oxide on said wall;
   (d) conduit means disposed adjacent to and extending externally along said support means; and
   (e) means for supplying coolant to said conduit means to cool said support means.

2. An apparatus for removing metal oxide growth from the internal wall of a vertically disposed vapor phase oxidation reaction chamber comprising:
   (a) at least one elongated ceramic edge in brushing contact with metal oxide on said wall, said edge being disposed in a substantially vertical plane;
   (b) conduit means extending in a substantially vertical plane and substantially from top to bottom within said reactor chamber, said conduit means including at least two substantially horizontally disposed and vertically spaced hollow metal members for supporting each ceramic edge at a predetermined distance from the vertically extending portion of said conduit means and from said wall, said horizontally disposed hollow metal members being in fluid communication with said vertically extending portion of said conduit means;
   (c) means for supplying coolant to said conduit means; and
   (d) means for moving said conduit means and thus said ceramic edge along said metal oxide on said wall.

3. An apparatus for removing metal oxide accumulation from the internal wall of a titanium tetrahalide vapor phase oxidation chamber, said chamber having a centrally disposed longitudinal axis comprising:
   (a) at least one ceramic arm having a blade-like ceramic edge extending substantially longitudinally along and adjacent to, but spaced from, said wall;
   (b) first substantially longitudinally extending conduit means for maintaining each arm a predetermined distance from said longitudinal axis and said wall;
   (c) second substantially longitudinally extending conduit means disposed adjacent and external relative to said first conduit means for receiving cooling fluid to thereby cool said first conduit means; and
   (d) means for moving each ceramic arm along the metal oxide accumulated on said wall.

4. An apparatus for removing metal oxide growth from the internal wall of a cylindrical reactor wherein titanium dioxide is produced by vapor phase oxidation of titanium tetrahalide comprising:
   (a) at least one ceramic arm having a blade-like edge positioned adjacent to, but spaced from, the surface of the wall and being substantially parallel to the wall, said edge being elongated in the direction of the axis of said cylindrical reactor;
   (b) metal support members extending along each arm for supporting each blade-like edge in brushing contact with said metal oxide;
   (c) conduit means disposed adjacent and external relative to said support members and extending along substantially the entire length thereof;
   (d) means for supplying cooling fluid to said conduit means to cool said support members; and
   (e) means for rotatively moving each ceramic arm and support members in a path concentric to the wall.

5. The apparatus of claim 4 wherein each edge is positioned at a distance of 0.75 to 2.0 inches from the wall.

6. The apparatus of claim 4 wherein each edge is slanted at an angle greater than 90° with respect to a tangent to the circular path.

7. The apparatus of claim 4 wherein each support member is constructed out of a nickel alloy.

8. The apparatus of claim 4 wherein the cooling fluid is air.

9. The apparatus of claim 8 wherein the air is flowed at a rate of 6.5 to 8.5 standard cubic feet per minute per square foot of effective outside cooling area of each support member.

10. The apparatus of claim 4 wherein the ceramic edge has a thermoconductivity of less than 25 B.t.u./(hour), (square foot), (° F./inch).

11. The apparatus of claim 4 wherein the ceramic arm has sufficient resistance to a corrosive environment, a thermal conductivity of less than 210 B.t.u./(hour), (square foot), (° F./inch), and a Mohs hardness of at least 5.

12. An apparatus for removing metal oxide from the internal wall of a reactor chamber having a centrally disposed longitudinal axis comprising:
(a) a shaft extending along said longitudinal axis and into said chamber;
(b) support means mounted to said shaft and disposed within said chamber, said support means having a longitudinally extending surface disposed a predetermined distance from said wall;
(c) at least one longitudinally extending brushing member mounted to said support means, said brushing member having a longitudinally disposed ceramic edge in brushing contact with metal oxide on said wall;
(d) conduit means disposed adjacent and external relative to said support means and extending along said longitudinally extending surface thereof;
(e) means for supplying a coolant to said conduit means, said conduit means thereby cooling said support means; and
(f) means for rotating said shaft, thereby moving said edge across said metal oxide on said wall.

13. Apparatus according to claim 12 wherein said reaction chamber is substantially cylindrical and said means for rotating said shaft is motor means.

14. Apparatus according to claim 13 wherein said reaction chamber is for the vapor phase oxidation of titanium tetrachloride and said ceramic arm has sufficient resistance to a corrosive environment, a thermal conductivity of less than 210 B.t.u./(hour), (square foot), (° F./inch), and a Mohs' hardness of at least 5.

References Cited
UNITED STATES PATENTS

| | | | |
|---|---|---|---|
| 2,805,921 | 9/1957 | Schaumann | 23—202V |
| 2,869,311 | 1/1959 | Beeston, Jr. | 30—350X |
| 2,979,414 | 4/1961 | Ryshkewitch | 106—44 |

ROBERT W. MICHELL, Primary Examiner

U.S. Cl. X.R.

23—277, 293